Jan. 21, 1936.   F. G. KEECH ET AL   2,028,334
SAND DISTRIBUTOR FOR AUTOMOBILES
Filed Dec. 15, 1934   2 Sheets-Sheet 1

INVENTORS
Fred G. Keech
and Adolph Markowitz
BY Harry A. Rook
ATTORNEY

Jan. 21, 1936. F. G. KEECH ET AL 2,028,334
SAND DISTRIBUTOR FOR AUTOMOBILES
Filed Dec. 15, 1934 2 Sheets-Sheet 2

INVENTORS
Fred G. Keech
and Adolph Markowitz
BY Harry B. Kook
ATTORNEY

Patented Jan. 21, 1936

2,028,334

UNITED STATES PATENT OFFICE 2,028,334

SAND DISTRIBUTOR FOR AUTOMOBILES

Fred G. Keech, Newark, and Adolph Markowitz, Bloomfield, N. J.

Application December 15, 1934, Serial No. 757,652

8 Claims. (Cl. 291—32)

This invention relates to a device for distributing sand or similar hard granular material, particularly for use with automobiles for spreading sand over the area of the roadway immediately ahead of the path to be taken by the traction or driving wheels of the vehicle, so as to prevent skidding or slipping of the wheels.

Prime objects of the invention are to provide a sand distributing device which can be quickly operated at the will of the driver of the vehicle by a simple motion such as the pushing of an electric push button switch, so that distribution of the sand can be effected instantaneously and quickly stopped, as desired; to provide such a device wherein the sand may be distributed in varying quantities at the will of the operator, and large quantities can be spread in a short period of time, for example 18 quarts of sand in 3 seconds, and provide a sand spreader whereby the sand may be spread over large areas, for example, to cover the roadway two feet at each side of each rear wheel of an automobile where the spreader is mounted under the body of the automobile about centrally of the width thereof, or even, where desired, to spread the sand over distances twenty or thirty feet from the spreader.

Other objects of the invention are to provide a device of this character which shall embody novel and improved features of construction and shall be relatively inexpensive and at the same time reliable and durable in operation; and to obtain other advantages and results as will be brought out by the following description.

Referring to the accompanying drawings in which corresponding and like parts are designated throughout the several views by the same reference characters, Figure 1 is a side elevation of a sand distributor embodying our invention showing it applied to an automobile which is fragmentarily and schematically illustrated.

Figure 1:
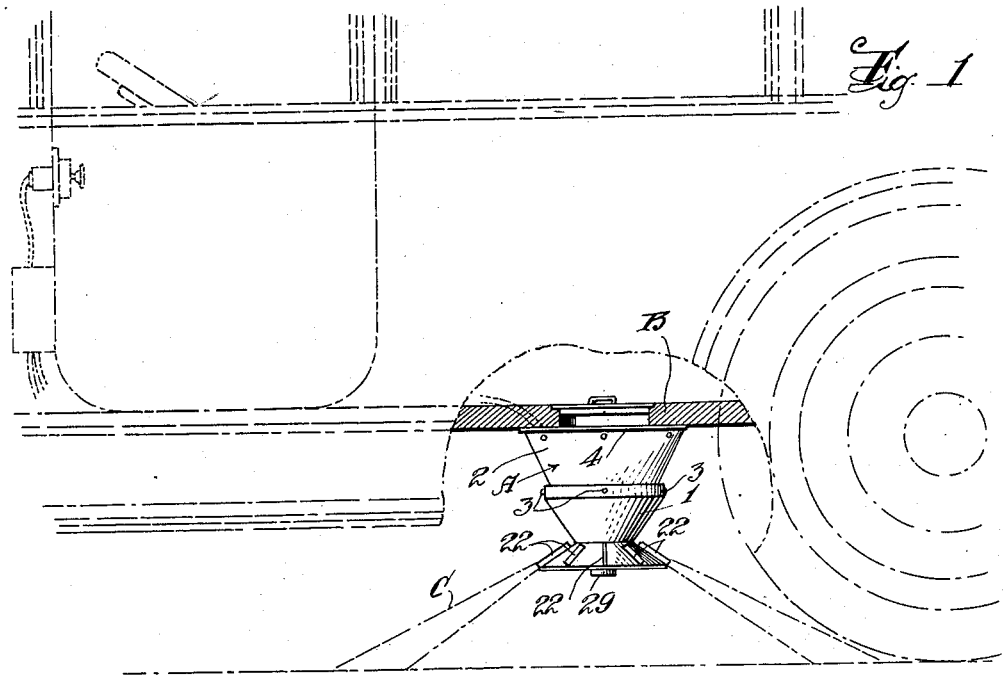
Figures 4, 5:
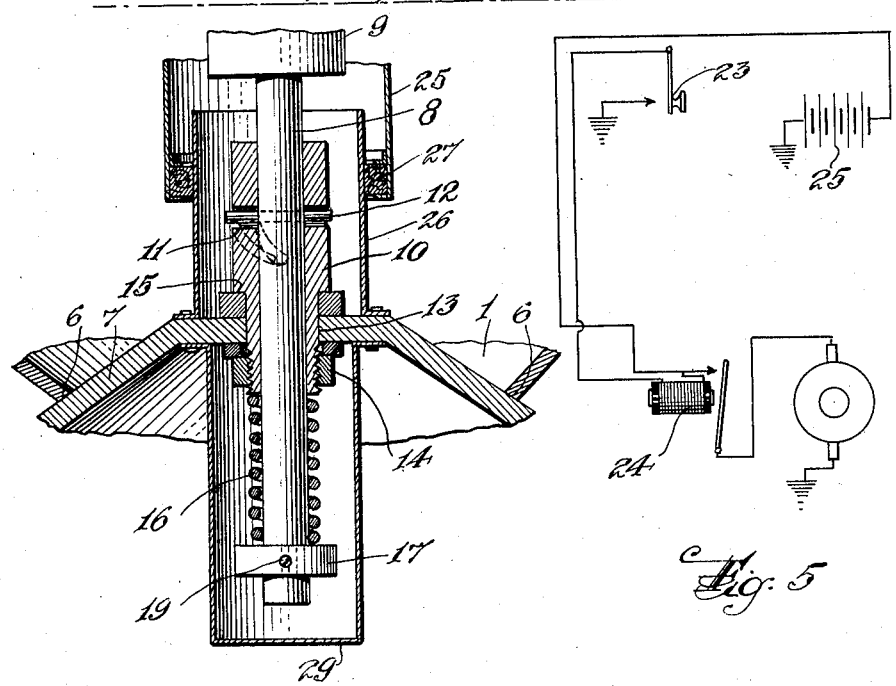
Figure 4 is an enlarged fragmentary transverse vertical sectional view through the lower end of the sand box and the connection between the drive shaft and the combined outlet valve for the sand box and rotatable distributor for the sand.
Figure 5 is a wire diagram for the motor control circuit.
Figure 2:
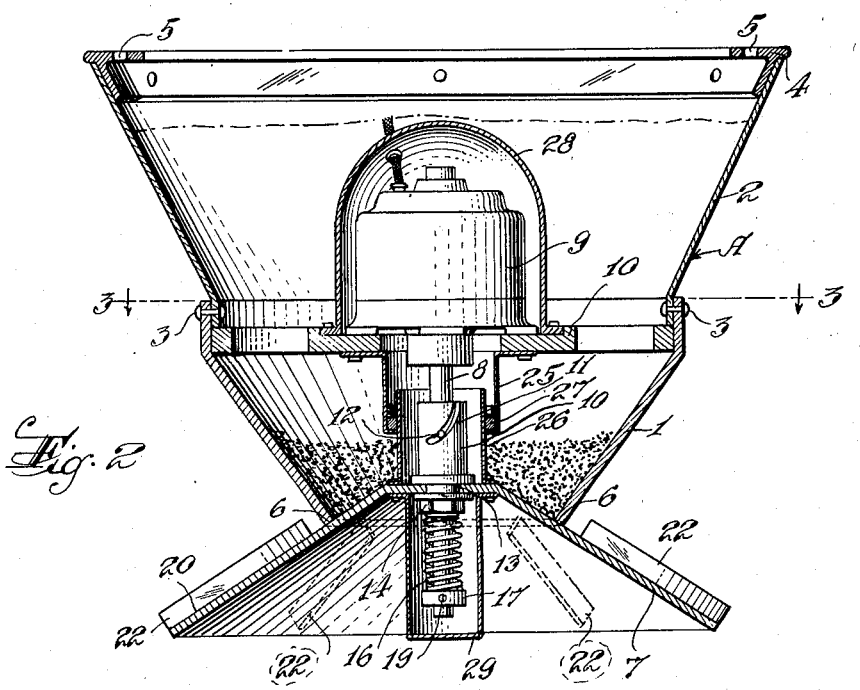
Figure 2 is an enlarged transverse vertical section through the sand distributor.
Figure 3:
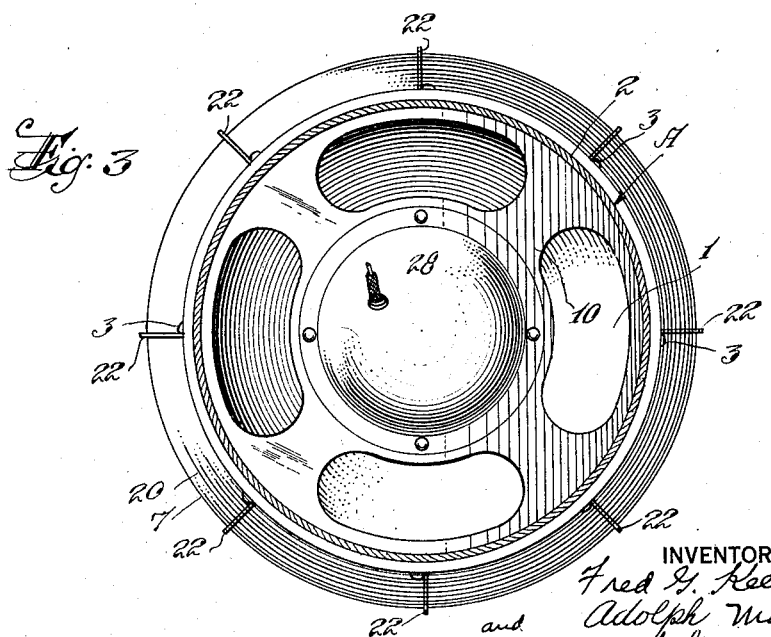
Figure 3 is a horizontal sectional view on the line 3—3 of Figure 2.

Specifically describing the illustrated embodiment of the invention, our sand distributor includes a sand box or hopper A which may be mounted on the floor B of an automobile or the chassis of the automobile, if desired, ahead of the traction or driving wheels of the vehicle. As shown, this sand box includes two frusto-conical sections 1 and 2 one end of each of which is connected to one end of the other as by rivets 3. The section 1 may be in the form of a casting for strength and durability, while the section 2 may be of sheet metal, and the end of the section 2 opposite the section 1 has a reenforced rim 4 provided with openings 5 to receive fastening members for mounting the box on a vehicle. The section 1 tapers from its connection with the section 2 toward its other end 6 which forms an outlet for the box through which the sand may flow by gravity.

A combined outlet valve and rotatable sand distributor 7 is mounted at the outlet end 6 of the sand box and constitutes approximately a frustum of a cone the smaller end of which extends into the sand box and the other end of which projects a substantial distance beyond the edges of the outlet opening 6 to form a sand distributing apron.

This combined outlet valve and distributor is connected to the drive shaft 8 of an electric motor 9 which is mounted on a spider 10' secured in the section 1 of the sand box. This spider serves both as a support for the motor and to partially support the sand in the box and relieve the outlet valve and distributor 7 of a portion of the weight of the sand. The connection between the outlet valve and the shaft is shown as comprising a sleeve 10 longitudinally slidable on the shaft and having cam slots 11 into which extend the ends of a pin 12 secured in and extending transversely of the shaft, so that the sleeve 10 is both longitudinally slidable on the shaft and rotatable therewith. The outlet valve has an opening 13 through which the sleeve 10 projects, and a clamping coat 14 clamps the outlet valve between itself and a shoulder 15 on the sleeve. For normally influencing the outlet valve into a position to close the outlet opening 6 of the sand box, we have shown a compression spring 16 interposed between the sleeve 10 and a collar 17 adjustable by a set screw 19 on the shaft 8.

With this construction, it will be observed that the outlet valve normally closes the outlet of the sand box while the shaft 8 is stationary. Upon rotation of the shaft 8, the pin 12 has a sliding action in the cam slots 11 so as to force the outlet valve 7 downwardly away from the outlet end of the box so as to permit sand to flow from the outlet opening on to the apron portion 20 of the valve and distributor 7; and at the same time, the distributor is caused to rotate with the shaft. This action results in a spreading or distribution of the sand centrifugally from the edges of the apron 20 as indicated by dot and dash lines C in Figure 1. Preferably radial vanes or cleats 22 are mounted on the apron 20 to facilitate the centrifugal distribution of the sand.

Upon stopping of rotation of the shaft 8, the spring 16 will force the valve and distributor 7 upwardly to close the outlet opening of the sand box, and of course rotation of the distributor will stop at the same time. It will therefore be seen that by varying the length of time during which the shaft of the motor is rotated, the quantities of sand distributed may be varied, and either large quantities or small quantities may be distributed as desired. The quantities of sand distributed may further be adjusted by varying the compression of the spring 16 as by sliding the collar 17 toward or from the sleeve 10. This will vary the resistance of the spring to the cam action of the pin 12 in the slots 11 so as to permit the valve 7 to be opened more or less depending upon the force exerted by the spring.

For controlling operation of the motor at the will of the operator, we have shown a push button switch 23 mounted on the instrument board of the automobile and connected in circuit with a relay 24 and a source of electricity such as a battery 25, the relay controlling the circuit through the motor in known manner. Normally the push button switch 23 is open and the motor is stationary, but upon closing of the switch 23, the relay 24 is energized so as to close the circuit through the motor and start it in operation. The motor will operate so long as the switch 23 is closed, and therefore the operator may cause the motor to operate for long or short periods and thereby control the amount of sand distributed, at will.

For protecting the sleeve 10 and pin 12 from contact with the sand in the sand box, we have shown two telescoping sleeves 25 and 26, one on the spider 10' and the other on the valve and distributor 7, both in surrounding relation to the shaft 8 and sleeve 10. A packing ring 27 may be provided for preventing entering of sand between the sleeves. Obviously upon reciprocation of the sleeve 10, the sand guard sleeve 26 will slide relatively to the other guard sleeve 25.

It is also desirable to provide casings 28 and 29 for protecting the motor and the spring 16, respectively, from contact with sand, moisture or other foreign matter.

It will be observed that the motor, the shaft 8 and the valve and distributor 7 are arranged coaxially with respect to each other and the sand box so that a compact and well balanced relationship of the parts is provided.

While we have shown and described our invention as embodied in certain details of construction, it should be understood that this is primarily for the purpose of illustrating the principles of the invention, and that many modifications and changes may be made in the details of structure without departing from the spirit or scope of the invention.

Having thus described our invention, what we claim is:

1. A spreader for granular material comprising a box having an outlet to discharge the material by gravity, a combined revoluble distributor and outlet valve for said box which is also movable coaxially of said outlet to open and close the same, a drive shaft and means connecting said distributor and valve to said shaft so that said valve is opened by rotation of said shaft for simultaneously opening said outlet of the box and rotating said distributor to centrifugally spread the material and closing said outlet and stopping rotation of said distributor, upon starting and stopping of rotation of said shaft, respectively.

2. A spreader for granular material comprising a box having an outlet to discharge the material by gravity, a combined revoluble distributor and outlet valve for said box which is also movable coaxially of said outlet to open and close the same, a drive shaft and means connecting said distributor and valve to said shaft so that said valve is opened by rotation of said shaft for simultaneously opening said outlet of the box and rotating said distributor to centrifugally spread the material and closing said outlet and stopping rotation of said distributor, upon starting and stopping of rotation of said shaft, respectively, and adjustable yielding means for normally resisting movement of said valve and distributor into outlet opening position.

3. A spreader for granular material comprising a box having an outlet to discharge material by gravity, an electric motor mounted in said box and having a drive shaft coaxial with and projecting through said outlet, a combined rotatable distributor and valve for said outlet mounted for reciprocation on said shaft to open and close said outlet, means for normally yieldingly influencing said distributor and valve into position to close said outlet, and means connecting said shaft to said valve and distributor so that said valve is opened by rotation of said shaft for simultaneously sliding said valve and distributor on said shaft and rotating the distributor to permit material to flow from said outlet and to centrifugally spread the material upon rotation of said shaft.

4. A spreader for granular material comprising a box having an outlet to discharge material by gravity, an electric motor mounted in said box and having a drive shaft coaxial with and projecting through said outlet, a combined rotatable distributor and valve for said outlet mounted for reciprocation on said shaft to open and close said outlet, and means connecting said distributor and valve to said shaft so that said valve is opened by rotation of said shaft for simultaneously opening said outlet of the box and rotating said distributor to centrifugally spread the material and closing said outlet and stopping rotation of said distributor, upon starting and stopping of rotation of said shaft, respectively.

5. A spreader for granular material comprising a box having an outlet to discharge material by gravity, a rotatable shaft coaxially projecting through said outlet, a sleeve longitudinally slidable on said shaft and having a cam slot, a pin on said shaft and projecting into said slot, a combined rotatable distributor and valve for said outlet carried by and movable with said sleeve, and a spring for normally influencing said valve and distributor into position to close said outlet, so that rotation of said shaft causes said pin to ride in said slot and both rotate and move said sleeve distributor and valve longitudinally of the shaft against action of said spring, whereby to simultaneously open said outlet of the box and rotate said distributor, and close said outlet and stop rotation of said distributor, upon starting and stopping of rotation of said shaft respectively.

6. A spreader comprising a box of generally inverted frusto-conical shape having an outlet at one end, a spider plate mounted in said box adjacent the outlet, an electric motor mounted on said spider plate coaxially with said outlet and having a shaft projecting through the outlet, a rotatable distributor and valve for said outlet slidable longitudinally upon and rotatable relatively to said shaft, and means connecting said valve and distributor to said shaft for simultaneously opening said outlet of the box and rotating said distributor to centrifugally spread the material, and closing said outlet and stopping rotation of said distributor, by and upon starting and stopping of rotation of said shaft, respectively.

7. A spreader for granular material comprising a box and having an outlet to discharge material, a rotatable shaft coaxially projecting through said outlet, a combined rotatable distributor and valve for said outlet slidable and rotatable on said shaft, and means connecting said shaft and said distributor and valve to longitudinally slide and rotate the latter for simultaneously opening said outlet of the box and rotating said distributor to centrifugally spread the material, and closing said outlet and stopping rotation of said distributor, by and upon starting and stopping of rotation of said shaft, respectively.

8. A spreader for granular material comprising a box and having an outlet to discharge material, a rotatable shaft coaxially projecting through said outlet, a combined rotatable distributor and valve for said outlet slidable and rotatable on said shaft, means connecting said shaft and said distributor and valve for simultaneously rotating and sliding the latter in one direction to open said outlet and spread material by and upon rotation of the shaft in one direction, and means for sliding said distributor and valve in the opposite direction to close said outlet upon stopping of rotation of said shaft.

FRED G. KEECH.
ADOLPH MARKOWITZ.